UNITED STATES PATENT OFFICE.

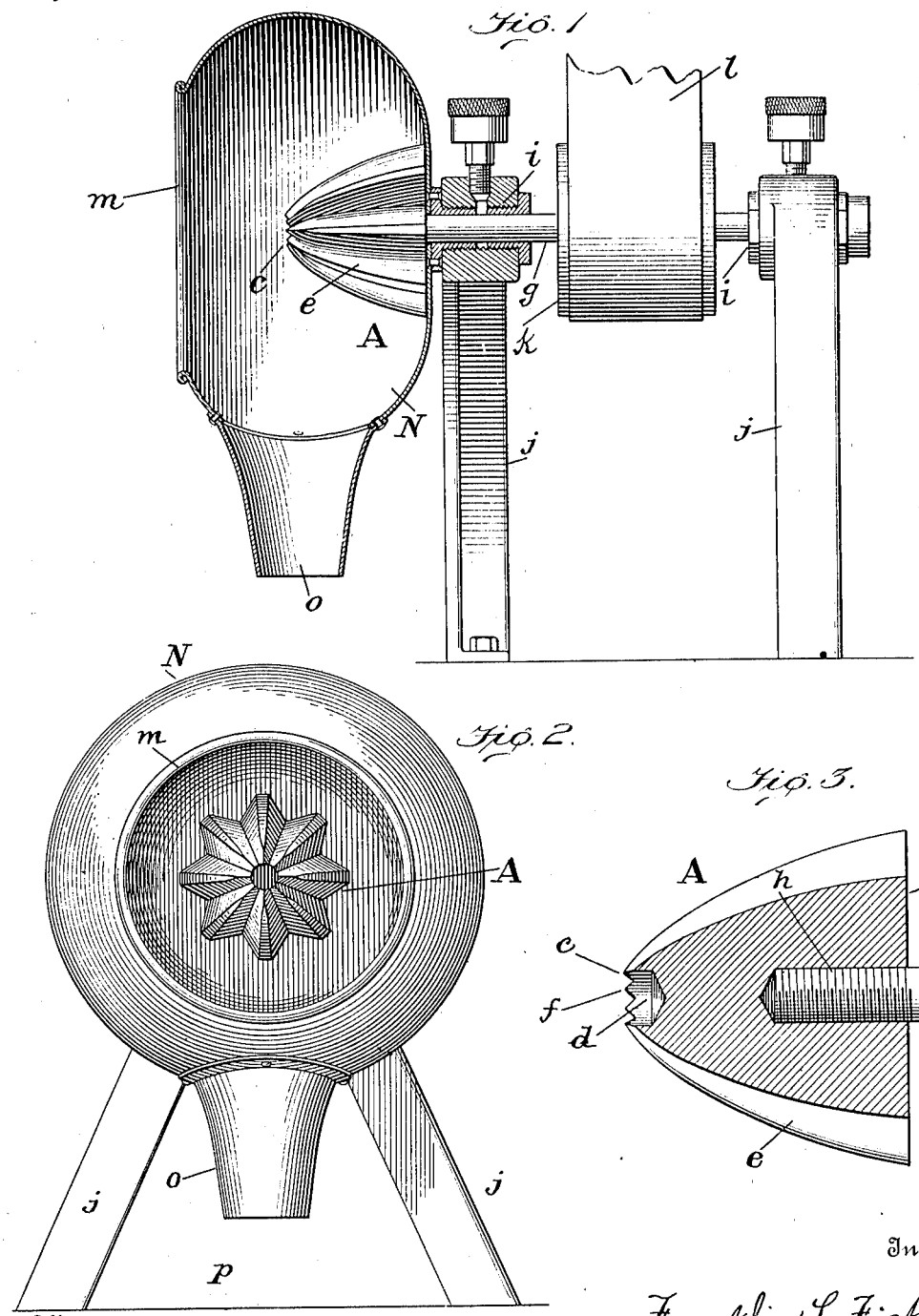

FRANKLIN S. FISKE, OF BALTIMORE, MARYLAND.

ORANGE AND LEMON JUICE AND PULP EXTRACTOR.

1,061,734. Specification of Letters Patent. Patented May 13, 1913.

Application filed August 22, 1912. Serial No. 716,459.

*To all whom it may concern:*

Be it known that I, FRANKLIN S. FISKE, a citizen of the United States, residing at Baltimore, in the State of Maryland, have invented certain new and useful Improvements in Orange and Lemon Juice and Pulp Extractors, of which the following is a specification.

This invention relates to a machine having a rotary reamer for expeditiously removing from such fruit as oranges and lemons, the juice and pulp without injuring the rind or skin, in order that the latter may be left in the best condition for the purpose of being grated or reduced to comminuted form, and for other purposes.

To illustrate my invention I have shown in the accompanying drawing one form of its embodiment which is at present preferred by me, since this form has given satisfactory results. It is to be understood however, that such a machine may be differently arranged and organized, and the invention therefore is not limited to the precise construction shown.

Figure 1 is an elevation showing the juice shield in vertical section. Fig. 2 is a front elevation. Fig. 3 is an enlarged view, an axial section, of the rotary pulp-remover.

The pulp and juice remover comprises a reamer head, A, whose body is solid and is approximately cone-shaped, whose large end is flat at, $b$, and whose small end or point, $c$, has a cup-shaped cavity, $d$, formed in the solid head. The cone-shape is not that of a straight taper from the large end to the point, but instead is curved—an axial section view, as in Fig. 3, showing a contour like one end of an ellipse. This reamer has corrugations, $e$, that extend longitudinally or parallel with the axis; the corrugations, $e$, taper and become smaller as they approach the point end of the cone and the small end of the raised part of each corrugation terminates at the said cavity, $d$, and these ends form teeth, $f$, plainly seen in Fig. 3; all of these teeth together form a circle or annular cutter around the cavity and constitute an important feature of the invention.

The cone-shaped reamer is mounted on a shaft, $g$, whose end, $h$, enters the center of the cone at its large flat end, $b$.

The cone-shaft turns in suitable bearings, $i$, resting on supports, $j$; and a driven pulley, $k$, is mounted on the shaft, while a belt, $l$, on the pulley receives motion from any suitable source causing the cone-shaped reamer to revolve.

A suitable housing or shield, N, is stationary and surrounds and incloses the cone-shaped reamer as shown; this inclosing shield, in the present instance, is attached to one of the supports, $j$, but of course it may be supported by any other means. The shield has at its front a circular opening, $m$, and at its bottom a discharge spout, $o$.

The fruit, for instance an orange, that is to be operated on by the machine, should first be cut into halves so that one half will be in readiness to be grasped by one hand of the attendant or operator. When this machine is in motion, the attendant or operator will grasp a separate one-half of an orange, a lemon, or whatever the fruit may be, and with the rounded or convex side of the half piece contacting with the palm of the hand, will enter the flat cut-side of the fruit foremost into the circular opening, $m$, of the housing or shield and press said cut side directly against the point, $c$, of the revolving reamer head, A; the action on the fruit of the toothed cutters, $f$, at the point, together with the action of the corrugations, $e$, on the cone which gradually expand circumferentially in dimension from the cone point, is such as to release the juice, grind the pulp, and entirely loosen and remove the pulp from the rind or skin; the juice and pulp will pass down the discharge spout, $o$, and will be received into any suitable vessel which the attendant may place below the spout in the position designated, $p$. The attendant will then place the empty rind of the half piece of fruit in another vessel, and proceed to apply another half piece of fruit against the point-end of the revolving reamer, as already explained.

The shield, N, that incloses the revolving reamer collects the juice of the fruit, and prevents it from being scattered by the action of revolution of said reamer.

The rinds of the fruit, by the operation above described, are left in good condition to be handled for grating.

Having thus described my invention what I claim and desire to secure by Letters Patent is:—

1. A machine for removing the juice and pulp from fruit such as oranges and lemons, comprising a head approximately cone-shaped and provided at its small end with a cavity, and having corrugations extending parallel with the axis of said head and the small end of the raised part of each corrugation forming a tooth at said cavity, whereby an annular-shaped toothed cutter is produced around the cavity.

2. In a machine for removing juice and pulp from such fruit as oranges and lemons, the combination of a horizontal revoluble shaft, a solid head whose exterior is approximately cone-shaped and attached to the shaft and said head provided at its small end with a circular cup-shaped cavity formed in the solid head, and a circle of toothed cutters around said cavity.

In testimony whereof I affix my signature in presence of two witnesses.

FRANKLIN S. FISKE.

Witnesses:
G. FERD. VOGT,
CHAS. B. MANN.